(12) United States Patent
Taketani

(10) Patent No.: US 10,616,504 B2
(45) Date of Patent: Apr. 7, 2020

(54) INFORMATION PROCESSING DEVICE, IMAGE DISPLAY DEVICE, IMAGE DISPLAY SYSTEM, AND INFORMATION PROCESSING METHOD

(71) Applicant: CANON KABUSHIKI KAISHA, Tokyo (JP)

(72) Inventor: Akihito Taketani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/464,834

(22) Filed: Mar. 21, 2017

(65) Prior Publication Data

US 2017/0280062 A1    Sep. 28, 2017

(30) Foreign Application Priority Data

Mar. 28, 2016  (JP) ................................. 2016-064704

(51) Int. Cl.
| | | |
|---|---|---|
| *H04N 5/225* | (2006.01) | |
| *H04N 5/265* | (2006.01) | |
| *H04N 7/18* | (2006.01) | |
| *G02B 27/01* | (2006.01) | |

(52) U.S. Cl.
CPC .......... *H04N 5/265* (2013.01); *G02B 27/017* (2013.01); *G02B 27/0172* (2013.01); *H04N 7/183* (2013.01); *G02B 2027/014* (2013.01); *G02B 2027/0138* (2013.01); *G02B 2027/0147* (2013.01); *G02B 2027/0187* (2013.01)

(58) Field of Classification Search
CPC .............. G02B 27/017; G02B 27/0172; G02B 2027/014; G02B 2027/0147; G06T 19/006; G06T 11/60; G06T 15/005; G06F 3/012; G06F 3/017
See application file for complete search history.

(56) References Cited

U.S. PATENT DOCUMENTS

| | | | | |
|---|---|---|---|---|
| 6,546,144 B1* | 4/2003 | Fukuhara | .............. | G06T 3/0012 382/232 |
| 9,448,704 B1* | 9/2016 | Belhumeur | ......... | G06F 3/04842 |
| 2011/0052140 A1* | 3/2011 | Mori | ...................... | H04N 5/772 386/224 |
| 2011/0285866 A1* | 11/2011 | Bhrugumalla | ..... | H04N 5/23232 348/218.1 |
| 2016/0012567 A1* | 1/2016 | Siddiqui | .............. | H04N 13/239 382/154 |
| 2017/0115488 A1* | 4/2017 | Ambrus | ............. | G02B 27/0172 |
| 2017/0205886 A1* | 7/2017 | Wan | ........................ | G06F 3/011 |

FOREIGN PATENT DOCUMENTS

| | | |
|---|---|---|
| JP | 2003-199074 A | 7/2003 |
| JP | 2010-092436 A | 4/2010 |
| JP | 2013-251781 A | 12/2013 |

* cited by examiner

*Primary Examiner* — Kelly L Jerabek
(74) *Attorney, Agent, or Firm* — Canon U.S.A., Inc. IP Division

(57) ABSTRACT

A configuration reduces a total data amount required for processing or transmitting image data by splitting an image captured by an image capturing unit into a first image for calculating a position and an orientation of the image capturing unit and a second image serving as a background for generating a virtual image.

16 Claims, 5 Drawing Sheets

INFORMATION PROCESSING DEVICE, IMAGE DISPLAY DEVICE, IMAGE DISPLAY SYSTEM, AND INFORMATION PROCESSING METHOD

BACKGROUND

Field

The present disclosure relates to a technique of processing image data captured by an image capturing unit provided in an image display device.

Description of the Related Art

In recent years, a mixed reality (MR) technique and an augmented reality (AR) technique have been known as techniques for achieving real-time and seamless mixing of real space and a virtual space. As one such technique, a video-see-through head-mounted display (HMD) is utilized. In an image display system based on this technique, a video camera captures an image of an object that approximately matches the object as viewed from a pupil position of a wearer of the HMD. The wearer of the HMD can observe, through a display panel of the HMD, an image in which computer graphics (CG) overlap with the captured image.

The image display system executes given processing on an image captured by an image capturing unit in the HMD and transmits the resultant image to an information processing device (personal computer (PC)) to perform calculation for rendering the CG to be superimposed on the captured image. After executing image processing to obtain an image to be displayed in the information processing device, the image display system transmits the image to be displayed to the HMD to display the image on a display panel in the HMD. Recently, a demand to increase the number of pixels in an imaging device to achieve higher image quality has led to an increase in a total amount of data to be processed and transmitted, resulting in a large-scale system.

In order to resolve this issue, various techniques for compressing an image and then transmitting the compressed image have been actively developed. However, since the compression process itself consumes a large amount of system resources, such a technique is not necessarily an effective solution since HMDs need to be small and light weight. To address this, Japanese Patent Application Laid-Open No. 2013-251781 discusses a technique for separately processing images, e.g., four full high-definition (HD) images, obtained by splitting a high-resolution, e.g., 4K, image, and a low resolution image, e.g., a single full HD image, obtained by resolution conversion, and then the resultant images are transmitted and combined.

The splitting technique discussed in Japanese Patent Application Laid-Open No. 2013-251781 produces the split images showing a total data amount that is larger than a data amount of the original captured images. Thus, the process or transmission amount of data needs to be further reduced, depending on the system employing the technique.

SUMMARY

An image processing device includes a first generation unit configured to generate, based on an image captured by an image capturing unit, a first image representing a predetermined range and a second image representing a part of the predetermined range, an obtaining unit configured to obtain a position and an orientation of the image capturing unit based on the generated first image, a second generation unit configured to generate a virtual image based on the obtained position and orientation, and a combining unit configured to generate a composite image based on the second image and the virtual image.

Further features will become apparent from the following description of exemplary embodiments with reference to the attached drawings.

DESCRIPTION OF THE EMBODIMENTS

Figure 1:
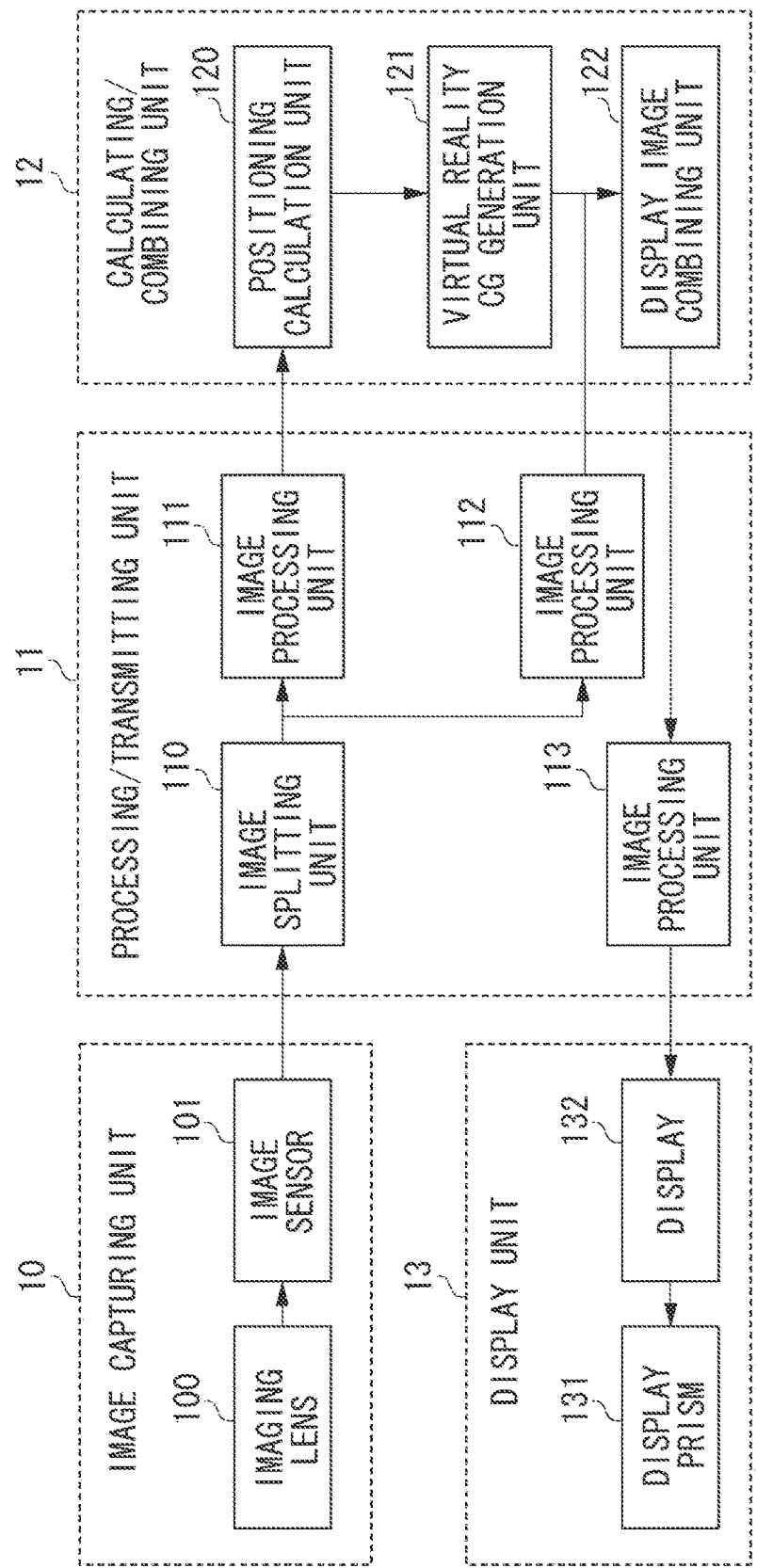
FIG. 1 is a block diagram illustrating an image display system according to a first exemplary embodiment.

A first exemplary embodiment is described below with referent to the drawings. FIG. 1 is a block diagram illustrating a configuration of an image display system according to the present exemplary embodiment. As illustrated in FIG. 1, the image display system generally includes four functional units: an image capturing unit 10, a processing/transmitting unit 11, a calculating/combining unit 12, and a display unit 13. The image capturing unit captures and generates an image. The processing/transmitting unit 11 splits the captured image, and executes image processing on the captured image and the displayed image. The calculating/combining unit 12 executes calculation for positioning, various types of calculation for generating virtual reality CG, and executes processing of combining the CG with the displayed image. The display unit 13 displays the display target image so that the HMD wearer can view the displayed image.

The image capturing unit 10 and the display unit 13 are provided in an HMD corresponding to an image display device in the system. The processing/transmitting unit 11 and the calculating/combining unit 12 are provided in a personal computer (PC) corresponding to an information processing device in the system. The HMD and the information processing device (PC) are connected with each other via a wireless or wired connection, and each includes a hardware configuration including a central processing unit (CPU), a read only memory (ROM), and a random access memory (RAM). The CPU executes a program stored in the ROM or a hard disk (HD) to implement, for example, functional configurations and processing in flowcharts described below. The RAM includes a storage area functioning as a work area, on which the program is loaded and executed by the CPU. The ROM includes an area storing the program to be executed by the CPU.

A person wearing the HMD including the image capturing unit 10 and the display unit 13 on the wearer's head can view an image obtained by superimposing the CG on an image of the outside world. Thus, the wearer of the HMD can experience mixed reality obtained by real-time mixing of the real space and the virtual space. In a case of the video-see-through HMD, it is important that a virtual reality object as viewed from a specific position and in a specific orientation is rendered as CG to approximately correspond to the line of sight of the wearer. Therefore, there are techniques for performing the positioning with an acceleration sensor, an angular velocity sensor, a geomagnetic sensor, a global positioning system GPS, and the like. Since the image capturing unit 10 according to the present exemplary embodiment is provided with an imaging sensor, when the captured image includes a marker or a spatial feature point, the calculating/combining unit 12 enables calculation of the position and the orientation the image capturing unit and superimposition of the CG with high accuracy.

The captured image used for the positioning calculation requires a large angle of view than high resolution. The captured image to be displayed on the display unit 13 of the HMD as a video-see-through background image preferably has the highest possible resolution in accordance with a display angle of view (display range). As described above, images of mixed types are derived from a single captured image, based on the different requirements in a later stage of the system depending on its intended purpose. Thus, utilizing this feature of the mixed images in the present exemplary embodiment, the image is split by the processing/transmitting unit 11 and a total amount of the processing in the entire system and transmission data can be suppressed while satisfying the requirements of the system.

The image capturing unit 10 includes an imaging lens 100 as an imaging optical system and an image sensor 101 as an imaging device. The image capturing unit 10 performs photoelectric conversion with the image sensor 101 on a subject image in a real space formed via the imaging lens 100, and thus acquires a captured image. As described above, the imaging lens 100 preferably has a wide angle of view for the positioning calculation. The image sensor 101 includes a semiconductor sensor, such as a complementary metal oxide semiconductor (CMOS) image sensor and a charge coupled device (CCD) image sensor. The amount of data on an image captured by the image capturing unit 10 increases with an increase in the number of pixels and frame rate.

The display unit 13 includes a display prism 131 and a display 132. The display unit 13 displays a combined image obtained by the calculating/combining unit 12 on the display 132. A light flux is image-formed via the display prism 131 for the observing person. The display prism 131 can be a lens or can be omitted, depending on the configuration of the HMD. The display 132 includes a display device such as a liquid crystal display panel or an organic electroluminescent (EL) panel. The display angle of view is determined in accordance with a distance to the wearer, an enlargement ratio of the display prism 131, and the size of the display 132. A higher visibility can be achieved with a higher resolution. However, the higher resolution requires an increase in the number of pixels and frame rate, which results in an increase in the amount of data on the displayed image.

Next, functions of the processing/transmitting unit 11 and the calculating/combining unit 12 provided in an information processing device are described. The processing/transmitting unit 11 (first generation unit) includes an image splitting unit 110 and image processing units 111 to 113. The image splitting unit 110 performs resolution conversion and processing of cropping a partial area, to generate a plurality of images from a single image. The image processing unit 111 processes a captured image (first image) that has been subjected to the resolution conversion. The image processing unit 112 processes the captured image (second image) that has been subjected to the cropping processing. The image processing unit 113 processes the display image. While the image splitting unit 110 according to the present exemplary embodiment splits the captured image into two images, the captured image can be split into three or more images depending on a requirement in the later stage of the system.

The calculating/combining unit 12 (second generation unit) includes a calculation unit 120, a virtual reality CG generation unit 121, and a display image combining unit 122. The positioning calculation unit 120 identifies the location of the HMD used by the wearer by detecting a marker or a feature point in the captured image. The virtual reality CG generation unit 121 renders the CG that is a virtual reality object as viewed from the identified location. The display image combining unit 122 produces a display image in response to a requirement from the display unit 13 by combining the virtual reality CG with a background image cropped by the image splitting unit 110. In many cases, the calculation and the combination processing requires a large amount of calculation that consumes larger system resources due to the increase in the pixels, and thus a high-end PC and a workstation is often used.

<Details of Data Splitting Processing>

Figure 2:
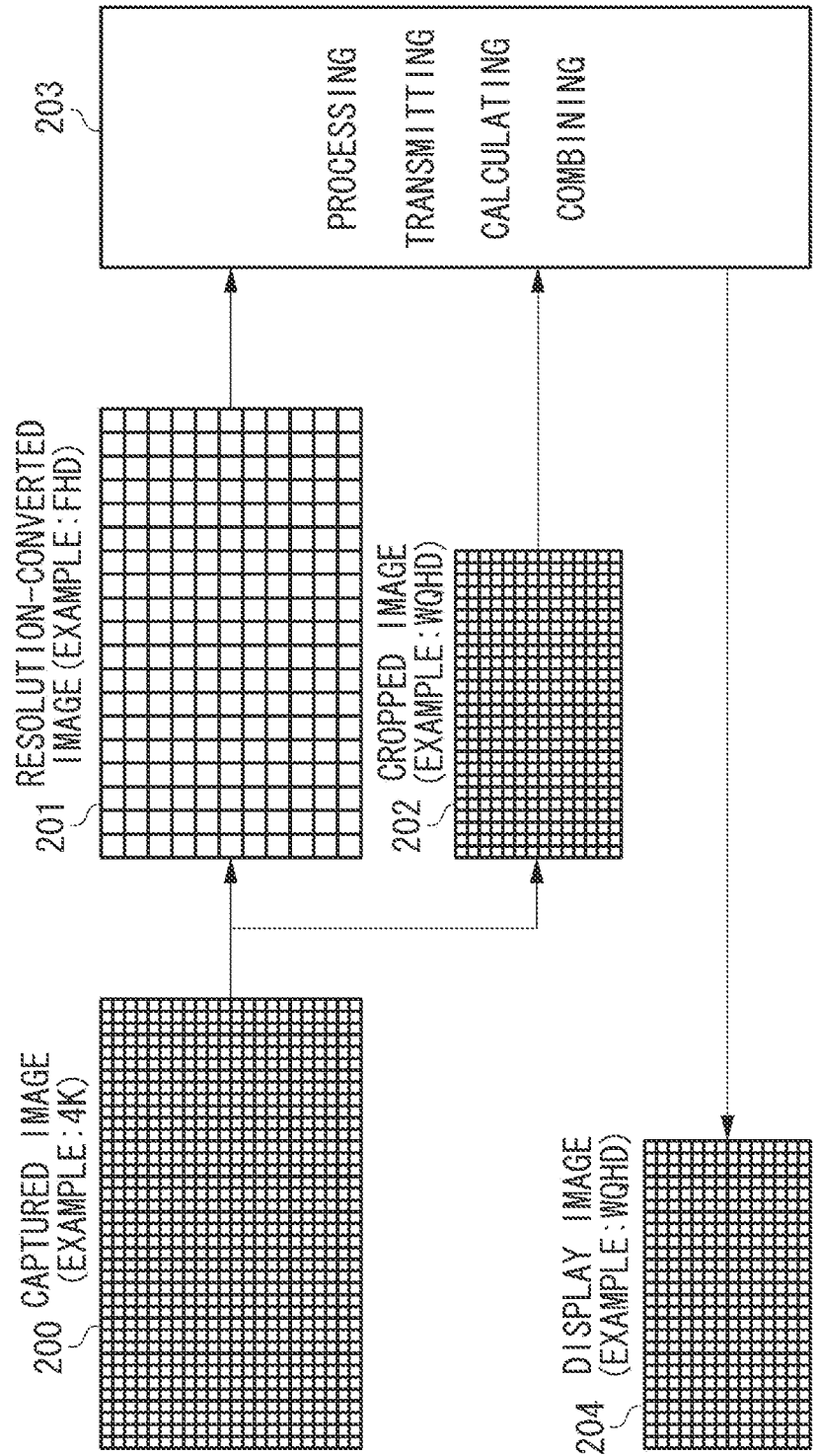
FIG. 2 is a schematic view illustrating an overview of data split processing according to the first exemplary embodiment.

Next, processing of splitting the image data (image) captured by the HMD in the image display system according to the present exemplary embodiment will be described. FIG. 2 is a schematic diagram illustrating an overview of the data splitting processing according to the present exemplary embodiment. In the figure, an image 200 captured by the image sensor 101 is a 4K (3840×2160) image with a 90° horizontal angle of view. An image 201 is a resolution converted image as a result of the resolution conversion by the image splitting unit 110. In this example, the image 201 is a full high-definition (HD) (1920×1080) image, and also in this case, the horizontal field of view is 90°. The resolution conversion can be achieved by various methods, such as pixel mixture and thinning. The present exemplary embodiment is not limited any specific method, and various methods can be employed as long as the resolution is reduced without changing the angle of view.

An image 202 is a cropped image as a result of the cropping processing executed by the image splitting unit 110. In this example, the image 202 is a wide quad HD (WQHD) (2560×1440) image with a 64° horizontal angle of view. The 64° horizontal angle of view is calculated based on a cropping ratio to crop an image from the original image of the 90° horizontal angle of view without changing the resolution, that is, pixel density. This cropped image with the angle of view of 64° is a part of the original image with the 90° angle of view.

Processing 203 collectively represents a series of processing including image processing, image transmission, positioning calculation, virtual reality CG calculation, and image combination for obtaining a display image. As described above, when the resolution and frame rate increase, the load on the processing 203 increases. This can be effectively prevented by splitting the image in advance.

An image 204 is a display image to be displayed on the display 132. In this example, the image 204 is a WQHD (2560×1440) image with the horizontal angle view of 64°. The image 202 is subjected to the cropping processing according to this pixel density, and shows the highest resolution, of angles of view required for the final display image.

In this series of processing, the image 200 includes approximately 8.3 megapixels, the resolution converted image 201 after splitting the image includes approximately 2.1 megapixels, and the cropped image 202 includes approximately 3.7 megapixels. Thus, the total data amount of the image data after the splitting is approximately 5.8 megapixels and thus is smaller than the original amount which is 8.3 megapixels. Accordingly, the entire load on the system can be reduced compared with a case where the processing and transmission are performed for the entire original captured image. The resolution converted image 201 satisfies the requirements of the positioning calculation unit 120, and the cropped image 202 satisfies the requirements of the display 132. Even when requirements of subsequent stages in the system are not satisfied, if a high priority is placed on reducing the total processing and transmission amount, the data transmission amount can be reduced based on the resolution conversion ratio and the cropping ratio from the original captured image. In any case, the present exemplary embodiment includes two types of images, that is, an image for positioning calculation which includes an angle of view more than the resolution, and an image with an angle of view in line with the display and a high resolution. By splitting the captured image into these images in an earliest possible stage, loads of the processing and transmission thereafter can be reduced.

Figure 3:
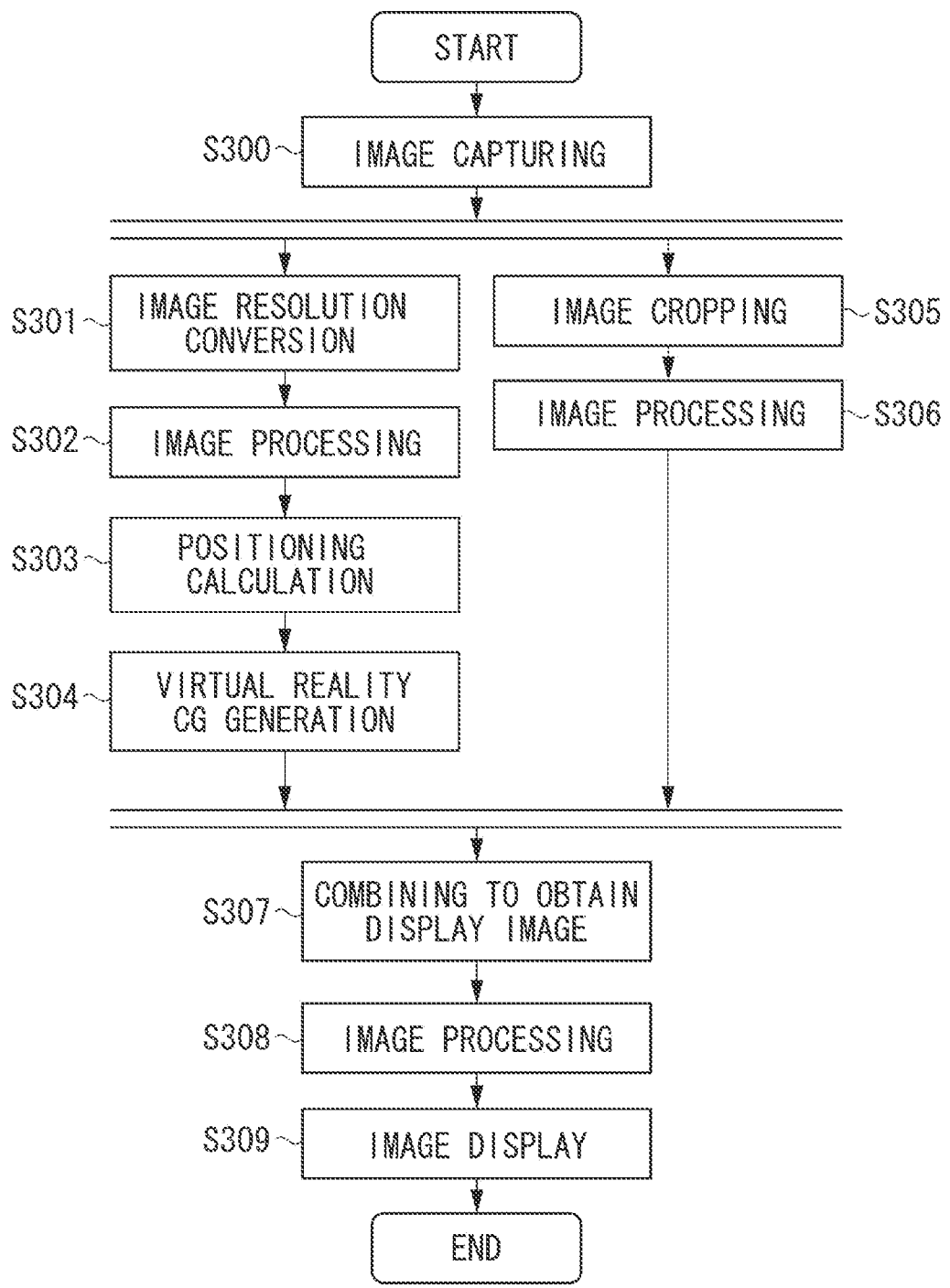
FIG. 3 is a flowchart illustrating a procedure of image transmission processing according to the first exemplary embodiment.

Next, a processing flow of an image transmission procedure according to the present exemplary embodiment is described with reference to FIG. 3. In the figure, in step S300, the image capturing unit 10 in the HMD captures an image of a real space. This image, including a wide angle of view and a high resolution, is transmitted to the image splitting unit 110 in the processing/transmitting unit 11. In the present exemplary embodiment, processing after step S300 includes steps S301 to S304 and steps S305 and S306, which are respectively executed in parallel. However, the present exemplary embodiment is not limited to such a processing procedure.

In step S301, the image splitting unit 110 executes resolution conversion of the captured image according to a resolution required in the calculation performed by the positioning calculation unit 120. In step S302, the image processing unit 111 executes various types of image processing, including color correction and noise reduction, on the resolution converted image.

In step S303, the positioning calculation unit 120 within the calculating/combining unit 12 detects a marker or a spatial feature point in the captured image, and performs calculation to estimate the position and the orientation of the HMD wearer. Then, in step S304, the virtual reality CG generation unit 121 renders and generates the CG of a virtual reality object as viewed from the position and the orientation of the HMD wearer according to the position and orientation information estimated in step S303.

In step S305, the processing starts in parallel with the processing in step S301. The image splitting unit 110 crops the captured image obtained by the image sensor 101 into an image with a resolution required according to the specification of the display image combining unit 122 or the display 132. This process determines not only the angle of view, but also the position of the cropped image based on the specification of a display lens. Next, in step S306, the image processing unit 112 executes various types of image processing on the cropped image like in step S302.

In step S307, the display image combining unit 122 combines the captured image cropped by the image splitting unit 110 for use as a background of the video-see through HMD, with the virtual reality CG generated by the virtual reality CG generation unit 121. The combined image is used as an image to be displayed on the display 132. In step S308, the image processing unit 113 executes various types of image processing, such as brightness correction and color correction, on the displayed image. In step S309, the display 132 in the display unit 13 presents the display image that has been combined in the display image combining unit 122 and subjected to the image processing in the image processing unit 113.

Through the series of processing described above, the wearer of the HMD can experience the virtual reality space in which the virtual reality CG as viewed from the position and the orientation of the wearer is superimposed on the video-see-through image substantially corresponding to the wearer's line of sight. In the present exemplary embodiment, the image splitting unit 110 splits the captured image into a resolution converted image and a cropped image. Thus, the total data amount is reduced compared with a case where the entire captured image is processed and transmitted, which prevents the entire system from becoming large-sized.

In the above description, the position and the orientation are estimated using the calculating/combining unit 12. However, an acceleration sensor, an angular velocity sensor, a geomagnetic sensor, a GPS, and the like can additionally be used to estimate the position and the orientation with a higher estimation accuracy. In the configuration described above, the resolution converted image 201 is used for the positioning calculation. However, the resolution converted image 201 can also be used for other types of processing. For example, the resolution converted image 201 can be used for face detection processing or object recognition processing.

Next, a second exemplary embodiment of the present invention will be described. In the second exemplary embodiment, at least one of the resolution conversion and the image cropping to be performed by the image splitting unit 110 is controlled according to the change in a system configuration and a processing/transmitting status of the system. The second exemplary embodiment of the present invention is described below with reference to the figures. The configuration similar to that described in the first exemplary embodiment is denoted with the same reference numerals, and the description thereof will be omitted.

Figure 4:
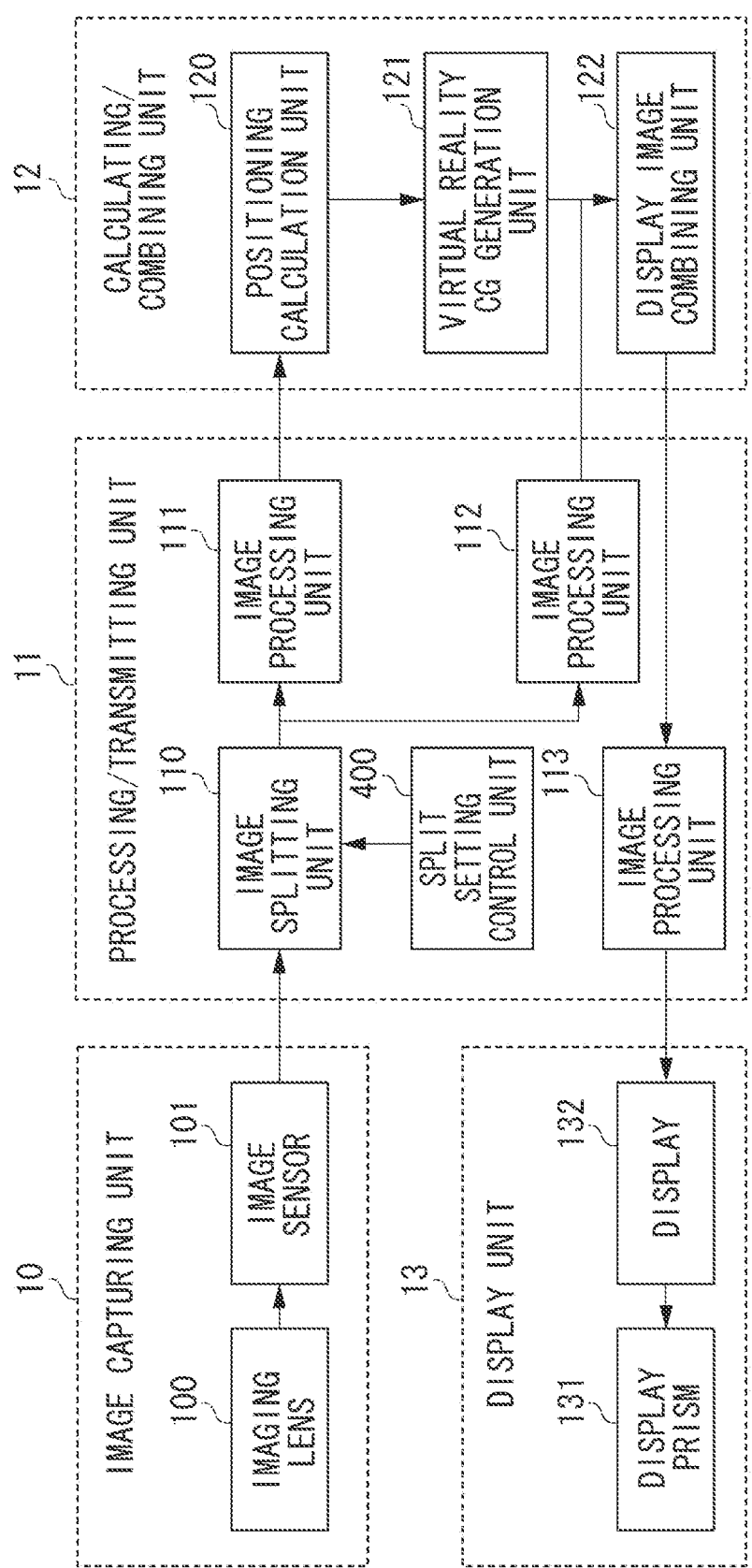
FIG. 4 is a block diagram illustrating an image display system according to a second exemplary embodiment.

FIG. 4 is a block diagram illustrating an image display system according to the present exemplary embodiment. The present exemplary embodiment is different from the first exemplary embodiment in that the processing/transmitting unit 11 includes a splitting setting control unit 400. In the image display system according to the present exemplary embodiment, a system configuration and a processing/transmitting status can change. For example, the PC used for the calculating/combining unit 12 can be changed by the user, or the HMD including the image capturing unit 10 and the display unit 13 can be changed without changing the processing/transmitting unit 11 and the calculating/combining unit 12. As an example of the processing/transmitting status change in the system, the load on the calculating/combining unit 12 can overwhelm the processing performance due to the content of image data obtained by the image capturing unit 10. As another example of such a case, the transmission may not be best performed due to degradation of a running throughput in unstable communications attributable to packet losses in a transmission path. Therefore, the image display system according to the present exemplary embodiment includes the splitting setting control unit 400 for such cases.

The splitting setting control unit 400 is connected to the system components, and monitors the status of the processing and the transmission of the system. When the performance of the system as a whole is degraded due to the statuses of the image processing unit 111 and the positioning calculation unit 120, the splitting setting control unit 400 issues an instruction for further lowering the resolution conversion ratio, to the image splitting unit 110. If the resolution conversion ratio is adjusted as described above, the performance related to processing/transmission of the system as a whole is optimized. Thus, the system can be smoothly operated. The cropping amount for the captured image or both the cropping amount and the resolution conversion can be adjusted depending on the statuses of the image processing unit 112 and the display image combining unit 122. When the system configuration is changed, the user can be instructed to input information about the change through an input unit of the image display system. Thus, the splitting setting control unit 400 that has acquired the information can perform control in such a manner that the resolution conversion ratio and the cropping ratio are adjusted.

<Details of Data Splitting Processing>

Figure 5:
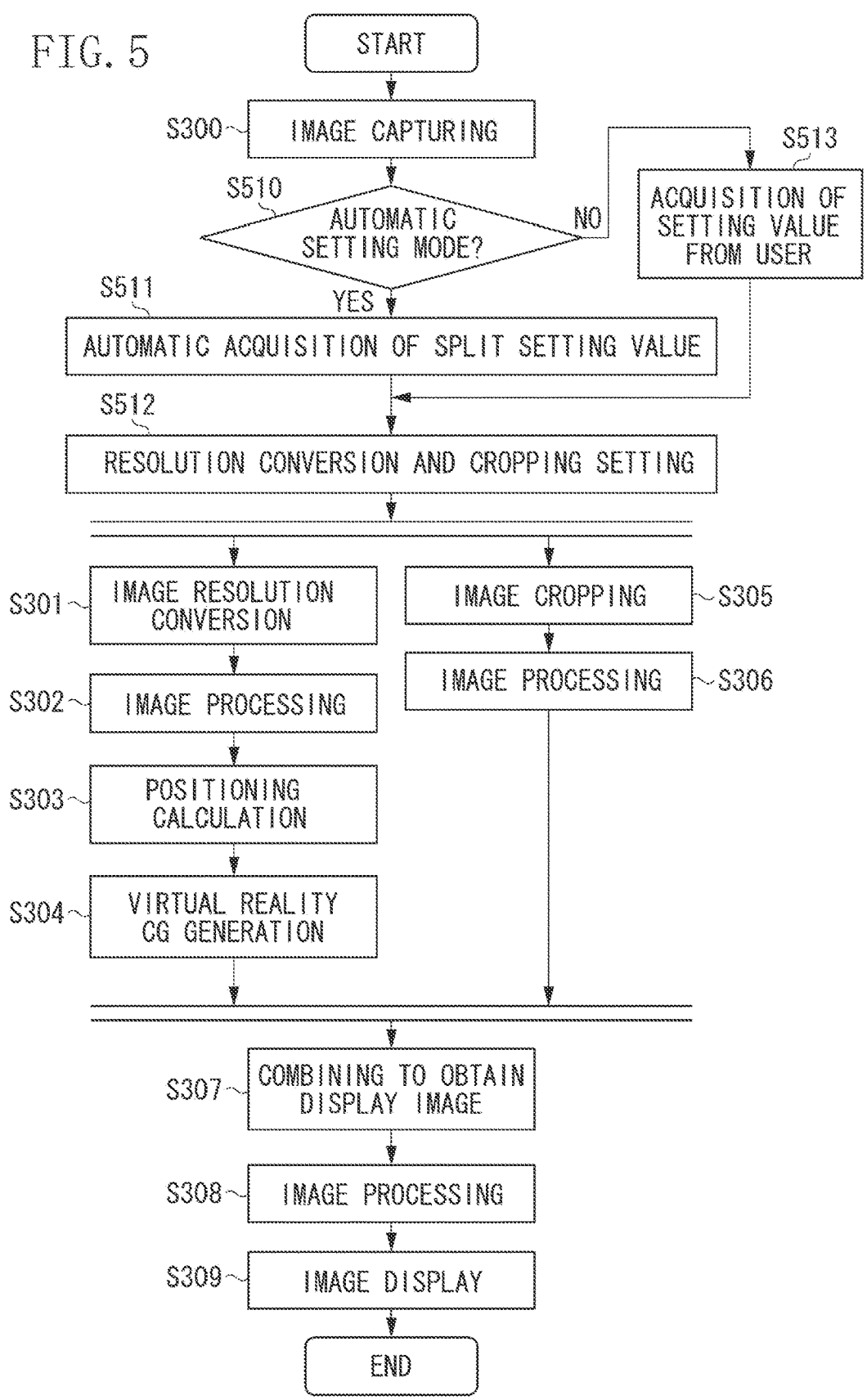
FIG. 5 is a flowchart illustrating a procedure of image transmission processing according to the second exemplary embodiment.

Next, a processing flow of a procedure for transmitting an image according to the present exemplary embodiment is described with reference to FIG. 5. The processing flow according to the present exemplary embodiment is different from the first exemplary embodiment in that steps S510 to S513 are added. As such, only the difference(s) from the first exemplary embodiment will be described below.

In step S510, the splitting setting control unit 400 determines whether the system is in an automatic setting mode of issuing an instruction to the image splitting unit 110. In the automatic setting mode, the system automatically and actively sets the image splitting setting based on the processing/transmission status. When the system is in the automatic setting mode (Yes in step S510), the processing proceeds to step S511. When the system is not in the automatic setting mode (No in step S510), the processing proceeds to step S513.

In step S511, the setting control unit 400 in the automatic setting mode, connected to the system components, automatically calculates an optimum resolution to be converted and an optimum cropping amount, based on feedback from the system components, and thus acquires a setting value for the image splitting unit 110. Next, in step S512, the splitting setting control unit 400 issues an instruction based on the setting value calculated in step S511 to the image splitting unit 110.

In step S513, the splitting setting control unit 400 receives a splitting setting value from the user when the system is not in the automatic setting mode. Alternatively, an initial value set in the system, or a setting value input by the user in advance for a case where the system is changed can be used. The splitting setting control unit 400 issues the instruction to the image splitting unit 110 in step S512 after acquiring any one of the setting values. Processing after step S512 is the same as that described in the first exemplary embodiment, and thus a detailed description is omitted herein.

In the above-described present exemplary embodiment, splitting setting for image data can be actively changed. Thus, a processing/transmission amount of the image data can be reduced to achieve an optimum performance of the entire system.

[Other Exemplary Embodiments]

In the configuration described above, the HMD includes the image capturing unit 10 and the display unit 13, and the image processing device (PC) includes the processing/transmitting unit 11 and the calculating/combining unit 12. However, this configuration is not seen to be limiting. For example, the HMD can include all four functional units, and the processing can be entirely executed in the HMD.

With the configuration according to the exemplary embodiments, a total data amount required for processing or transmitting image data in an entire system can be reduced.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-064704, filed Mar. 28, 2016, which is hereby incorporated by reference herein in its entirety.

What is claimed is:

1. An image processing device comprising:
one or more processors; and
one or more memories storing instructions, when executed by the one or more processors, causing the image processing device to function as:
a first generation unit including an image splitting unit, a first image processing unit, and a second image processing unit,
wherein the image splitting unit with the first image processing unit generates, from a captured image that is captured by an image capturing unit, a first image representing a predetermined range, and
wherein the image splitting unit with the second image processing unit generates, from the captured image, a second image representing a part of the predetermined range;
an obtaining unit configured to obtain a position and an orientation of the image capturing unit based on the generated first image;
a second generation unit configured to generate a virtual image based on the obtained position and orientation; and a combining unit configured to generate a composite image based on the second image and the virtual image.

2. The image processing device according to claim 1, wherein the first image is an image with a predetermined resolution, and
wherein the second image is an image with a higher resolution than the predetermined resolution.

3. The image processing device according to claim 1, wherein the first image and the second image are generated in such a manner that a total data amount of the first image and the second image is less than a data amount of an image captured by the image capturing unit.

4. The image processing device according to claim 1, wherein the image splitting unit with the first image processing unit generates the first image by performing resolution conversion on an image captured by the image capturing unit.

5. The image processing device according to claim 4, further comprising a control unit configured to change a ratio of the resolution conversion based on a processing status in the image processing device.

6. The image processing device according to claim 1, wherein the first generation unit is configured to generate the second image by performing resolution conversion on the image captured by the image capturing unit and cropping a part of the captured image.

7. The image processing device according to claim 6, further comprising a control unit configured to change at least one of a ratio of the resolution conversion or an image cropping amount based on a processing status of the image processing device when generating the second image through the resolution conversion.

8. The image processing device according to claim 1, wherein an image display device connected to the image processing device includes the image capturing unit and a display unit configured to display the composite image.

9. The image processing device according to claim 8, wherein the image display device is a head-mounted display.

10. An image processing method comprising:
generating, by a first processing of a captured image, a first image representing a predetermined range; and
generating, by a second processing of the captured image, a second image representing a part of the predetermined range;
obtaining a position and an orientation of the image capturing unit based on the generated first image;
generating a virtual image based on the obtained position and orientation; and
generating a composite image based on the second image and the virtual image.

11. A non-transitory computer-readable storage medium storing computer-executable instructions for causing a computer to execute an image processing method, the image processing method comprising:
generating, by a first processing of a captured image, a first image representing a predetermined range; and
generating, by a second processing of the captured image, a second image representing a part of the predetermined range;
obtaining a position and an orientation of the image capturing unit based on the generated first image;
generating a virtual image based on the obtained position and orientation; and
generating a composite image based on the second image and the virtual image.

12. An image processing device comprising:
one or more processors; and
one or more memories storing instructions, when executed by the one or more processors, causing the image processing device to function as:
a first generation unit configured to generate a first image by reducing resolution of an image captured by an image capturing unit and to generate a second image by cropping a part of the captured image;
an obtaining unit configured to obtain a position and an orientation of the image capturing unit based on the generated first image;
a second generation unit configured to generate a virtual image based on the obtained position and orientation; and
a combining unit configured to generate a composite image based on the second image and the virtual image.

13. The image processing device according to claim 12, wherein the second image has an angle of view included in an angle of view of the first image.

14. The image processing device according to claim 13, wherein the first generation unit generates, by reducing resolution without changing the angle of view, the first image of which resolution is lower than resolution of the captured image, and
wherein the first generation unit generates, by a cropping a part of the captured image without changing the resolution, the second image of which angle of view is included in the angle of view of the first image.

15. An image processing method comprising:
generating a first image by reducing resolution of an image captured by an image capturing unit and generating a second image by cropping a part of the captured image;
obtaining a position and an orientation of the image capturing unit based on the generated first image;
generating a virtual image based on the obtained position and orientation; and combining the second image and the virtual image to generate a composite image.

16. A non-transitory computer-readable storage medium storing computer- executable instructions for causing a computer to execute an image processing method, the image processing method comprising:
generating a first image by reducing resolution of an image captured by an image capturing unit and generating a second image by cropping a part of the captured image;
obtaining a position and an orientation of the image capturing unit based on the generated first image;
generating a virtual image based on the obtained position and orientation; and
combining the second image and the virtual image to generate a composite image.

* * * * *